US006931534B1

(12) United States Patent
Jändel et al.

(10) Patent No.: US 6,931,534 B1
(45) Date of Patent: Aug. 16, 2005

(54) METHOD AND A DEVICE FOR ENCRYPTION OF IMAGES

(75) Inventors: Magnus Jändel, Upplands Väsby (SE); Mathias Larsson, Saltsjöbaden (SE)

(73) Assignee: Telefonaktiebolaget LM Erricsson (publ), Stockholm (SE)

( * ) Notice: Subject to any disclaimer, the term of this patent is extended or adjusted under 35 U.S.C. 154(b) by 0 days.

(21) Appl. No.: 09/443,813

(22) Filed: Nov. 19, 1999

(30) Foreign Application Priority Data

Nov. 20, 1998 (SE) ..................................... 9803979

(51) Int. Cl.$^7$ ............................................. H04L 9/00
(52) U.S. Cl. ...................... 713/176; 713/160; 713/180; 380/200; 380/201; 380/203
(58) Field of Search .................. 380/54, 200–203, 380/210–217; 713/176, 180, 160

(56) References Cited

U.S. PATENT DOCUMENTS

| | | | | |
|---|---|---|---|---|
| 5,195,135 A | * | 3/1993 | Palmer ....................... | 380/241 |
| 5,715,316 A | * | 2/1998 | Steenblik et al. ............. | 380/54 |
| 5,805,700 A | * | 9/1998 | Nardone et al. ............. | 380/217 |
| 5,845,088 A | * | 12/1998 | Lewis ......................... | 709/247 |
| 5,898,779 A | * | 4/1999 | Squilla et al. .............. | 713/176 |
| 5,953,506 A | * | 9/1999 | Kalra et al. .................. | 709/231 |
| 6,026,164 A | * | 2/2000 | Sakamoto et al. ........... | 380/217 |
| 6,216,228 B1 | * | 4/2001 | Chapman et al. ........... | 713/176 |
| 6,449,718 B1 | * | 9/2002 | Rucklidge et al. .......... | 713/168 |
| 6,557,102 B1 | * | 4/2003 | Wong et al. ................. | 713/176 |

FOREIGN PATENT DOCUMENTS

| EP | 0 614 308 A1 | 9/1994 |
|---|---|---|
| EP | 0 649 261 A2 | 4/1995 |
| NL | 1005523 | 11/1998 |

OTHER PUBLICATIONS

Kejariwal, A. et al, "Proxy-based Task Partitioning of Watermarking Algorithms for Reducing Energy Consumption in Mobile Devices", Jun. 7, 2004, ACM, entire document.*
Swanson, M. et al, "Multiresolution Scene-Based Video Watermarking Using Perceptual Models", IEEE. May 1998, entire document.*
Onishi, J. et al, "A Method of Watermarking with Multiresolution Analysis and Pseudo Noise Sequences", Dept. of CS, National Defense Acad., 1998, entire document.*

* cited by examiner

Primary Examiner—Gregory Morse
Assistant Examiner—Ronald Baum
(74) Attorney, Agent, or Firm—Nixon & Vanderhye, P.C.

(57) ABSTRACT

In a method and a device for partial encryption and progressive transmission of images, a first section of the image file is compressed at reduced quality without decryption, and a second section of the image file is encrypted. Users having access to appropriate decryption keywords can decrypt this second section. The first section together with the decrypted second section can then be viewed as a full quality image. The storage space required for storing the first and section together is essentially the same as the storage space required for storing the unencrypted full quality image. By using the method and device as described herein storage and bandwidth requirements for partially encrypted images is reduced. Furthermore, object based composition and processing of encrypted objects are facilitated, and ROIs can be encrypted. Also, the shape of a ROI can be encrypted and the original object can be decrypted and restored in the compressed domain.

19 Claims, 4 Drawing Sheets

METHOD AND A DEVICE FOR ENCRYPTION OF IMAGES

TECHNICAL FIELD

The present invention relates to a method and a device for encrypting images.

BACKGROUND OF THE INVENTION AND PRIOR ART

Encryption of digital data is a technical field which becomes important when transmitting and storing secret information or information which only shall be available to a user paying for the information. Thus, several methods for encrypting digital data are in frequent use. Such methods can also be applied also to digital image data. Examples of encryption methods are DES, triple DES and the public-key RSA method.

Digital images can be stored on servers and distributed over a telecommunication network as digital image data. Images can also be distributed using a physical storage medium such as a CD-ROM. Service providers need to establish access control that suits their business model. In this context it might be suitable to offer partial access to one set of users and full access to another set of users. Thus, some of the image data must be encrypted in order to prevent all users from having full access to all image data.

News photographs can e.g. be offered for sale on the Internet. The service provider wants to allow customers to download a version of the image with reduced quality for evaluation. Journals, that want to publish an image, pay for the service and are then allowed to download a full quality image.

However, such a service provider wants to minimize storage space and download bit rates. An image provider might alternatively want to distribute images on e.g. a CD-ROM. CD-ROMs are given away or sold for a low price. Customers can view the images at a reduced quality, but they must pay for viewing them at full quality. In the case the image provider wants to use the storage space on the CD-ROM as efficiently as possible.

It is also essential that customers always can access images using user friendly, standardised software. Image providers are reluctant to design and support special image viewers and customers don't want a proliferation of viewing tools.

Presently, image providers have to store two versions of the images stored. The full quality version is stored as an encrypted image file. This means that the image first is compressed and stored in a compressed file format such as JPEG or GIF. The compressed file is then encrypted using a suitable encryption tool and an encrypted image file is stored. The user must first decrypt this file and then access the resulting compressed image file using an image viewing tool. Reduced quality images are produced by processing the full quality images in an image editing program. They are stored as separate compressed image files.

The problems with this solution are that at least two different versions of the same image need to be stored, and that both versions must also be transmitted over the network in case of remote access in the case a customer first wants to see the free low resolution image before paying for the full resolution version.

This results in a significant disadvantage if the reduced version image contains a large fraction of the image information. Images that are offered for sale to journals would in particular be provided for preview at a fairly good quality since journal editors want to have a detailed understanding of the large content and accept only the highest quality for printing. The reduced quality image could require 10–50% of the storage space of the full quality image.

Furthermore, the emerging still image coding standard JPEG 2000, which is described in Charilaos Christopoulos (ed.), JPEG 2000 Verification Model Version 2.0, includes many new functionalities in comparison with other still image coding techniques. They include, in particular, methods for creating a wide range of progressive image formats. Each application domain can select a suitable progression mode. Individual objects within images can be accessed separately in the JPEG 2000 bitstream and progressive transmission can be applied also to objects. In JPEG 2000 there is also support for independently decodable coding units.

SUMMARY

It is an object of the present invention to overcome the problems as outlined above and in particular to reduce the amount of memory required for storing an image, which partially shall be possible to view, and also to reduce transmission time in a transmission scheme transmitting partially encrypted images.

This object and others are obtained by a technique for partial encryption and progressive transmission of images where a first section of the image file can be decompressed at reduced quality without decryption, i.e. the first low quality image is not encrypted, and where a second section of the image file is encrypted.

Thus, users having access to appropriate decryption keywords can decrypt this second section. The first section together with the decrypted second section can then be viewed as a full quality image. The storage space required for storing the first and section together is essentially the same as the storage space required for storing the unencrypted full quality image. The encryption of the second section may, depending on the encryption method, imply a slight expansion of the second section compared to the unencrypted second section.

The image can also be partitioned into multiple sections where each section may be encrypted with an individual encryption method and keyword. Some sections may be stored unencrypted. An important element of the method and device as described herein is that the compressed images consist of a set of independently decodable coding units (CU). This makes it possible to perform encryption operations in the compressed domain without performing entropy decoding.

A reduced quality image can be produced according to several different main schemes, such as:
1) Reduced resolution.
2) Reduced accuracy of the transform coefficients.
3) Exclusion of predefined regions of interest (ROI).

These methods can be combined so that a reduced quality image is e.g. produced by reducing both the resolution and the accuracy of the transform coefficients.

By using the method and device for storing and transmitting image data as described herein, several advantages are obtained. Thus, there is no need to store two different versions of an image if different users are to have access to different quality of the one and same image. Also, transmission times become much lower if the information content of the first, low resolution, image data can be reused when transmitting the higher resolution image data.

BRIEF DESCRIPTION OF THE DRAWINGS

The present invention will now be described in more detail and with reference to the accompanying drawings, in which.

DETAILED DESCRIPTION

Figure 1:
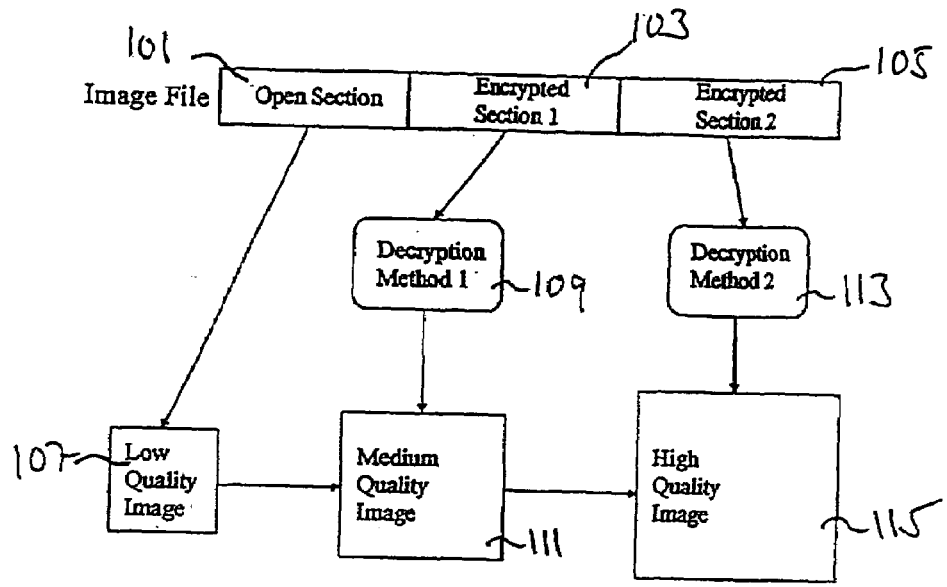
FIG. 1 is a general view of the file structure of an image.

In FIG. 1, a general view of the file structure of an original, high resolution, image is shown. Thus, the image data file consists of a number of different independently decodable coding sections 101, 103 and 105. In the file structure shown in FIG. 1, the section 101, which is a low resolution version of a high resolution image, is coded without encryption and will therefore be possible to decode by any receiver.

The section 103, which comprises data, which combined with the data of section 101, result in a medium resolution version of the high resolution image, is encrypted using a first encryption method, and only receivers having access to the correct encryption key will be able to decode the data stored in the section 103.

The section 105, which comprises data, which combined with the data of section 101 and 103 results in a full resolution version of the high resolution image, is encrypted using a second encryption method, and only receivers having access to the encryption key will be able to decode the data stored in the section 105.

Thus, decoding of the section 101 will result in a low resolution image version 107. Decryption 109 and decoding of the section 103 will, combined with the image data from the section 101 result in a medium resolution image 111. Decryption 113 and decoding of the section 105 will, combined with the image data from the sections 101 and 103 result in a full resolution image 115.

Furthermore, implementation in the JPEG 2000 standard without ROI, see Charilaos Christopoulos (ed.) JPEG 2000 Verification Model Version 2.0, describes how each coding unit of the JPEG 2000 bitstream can be inserted in the bitstream so that a wide range of progressive modes can be supported.

In JPEG 2000 verification model 2.0, a coding unit is a part of the bitstream that encodes a specific bitplane of a given subband. In general, a coding unit can be described as any independently decodable subset of image information. The general mechanism for specifying the bitstream order is to include so called tags that specify the next coding unit (it is sufficient to specify the subband since the bitplane order is known). Several specific modes can be defined in the header that defines a default coding unit order thus saving the bits that are needed for inserting explicit tags.

Figure 2A:
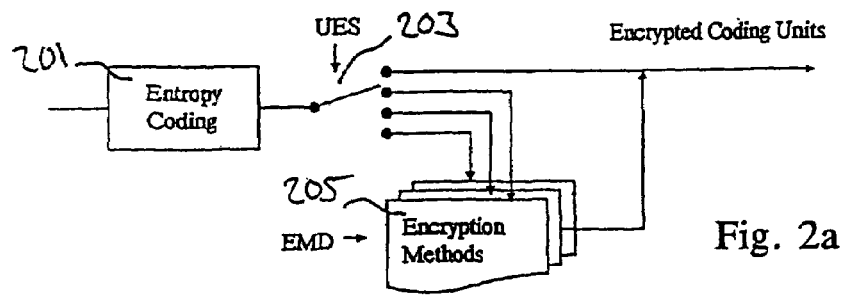
FIGS. 2a and 2b shows encryption of images coded according to the JPEG 2000 standard.
Figure 2B:
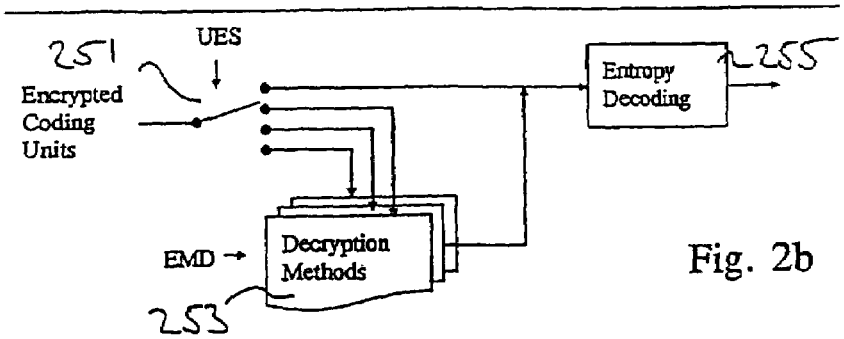

In FIGS. 2a and 2b block diagrams describing how encryption can be implemented in the JPEG 2000 encoder and decoder respectively, are shown.

Thus, in FIG. 2a a block diagram where encryption is performed after entropy coding in the encoder is shown. Coding units enter an entropy coding block 201. In the block 201 coding the coding units are entropy coded using some suitable entropy code. The output from the block 201 is fed to a selector which selects a suitable encryption method for each entropy coded coding unit. Some coding units can be selected to not be encrypted at all.

In response to the selection made in the selector 203 the entropy coded coding units are encrypted in a block 205. The encrypted coding units together with the not encrypted coding units then form a combined output data stream, which can be stored or transmitted.

In FIG. 2b a decoder for decoding the bit stream generated by the encoder in FIG. 2a is shown. Thus, first encrypted and not encrypted coding units enter the decoder via a selector 251, which selects a suitable decryption method for each entropy coded coding unit, or if the received coding unit is not encrypted it is directly transmitted to a block 255.

In response to the selection made in the selector 255 the entropy coded coding units are decrypted in a block 253 using a suitable decryption algorithm. The decrypted coding units are then fed to the block 255. In the block 255 the coding units from fed directly from the selector 251 and from the decryption block 253 are entropy decoded and combined to form a combined output data stream corresponding to the data stream which is fed to the entropy coding block 201 in FIG. 2a.

Each coding unit in the transmission scheme as shown in the FIGS. 2a and 2b is handled as an independently encrypted block. Each coding unit can also be encrypted separately with any user supplied encryption method. Different units in the same image can be encrypted with different encryption methods. The encryption method used can further be an encryption algorithm combined with a keyword or a method for generating keywords.

Different encryption methods can in such an embodiment have identical algorithms but different keywords. Encryption Method Description (EMD) as shown in FIGS. 2a and 2b is any global data such as session keywords or algorithm identifiers that is needed to specify the Encryption Method. Unit Encryption State (UES) is a symbol that for each coding unit defines how it is encrypted.

Figure 3:
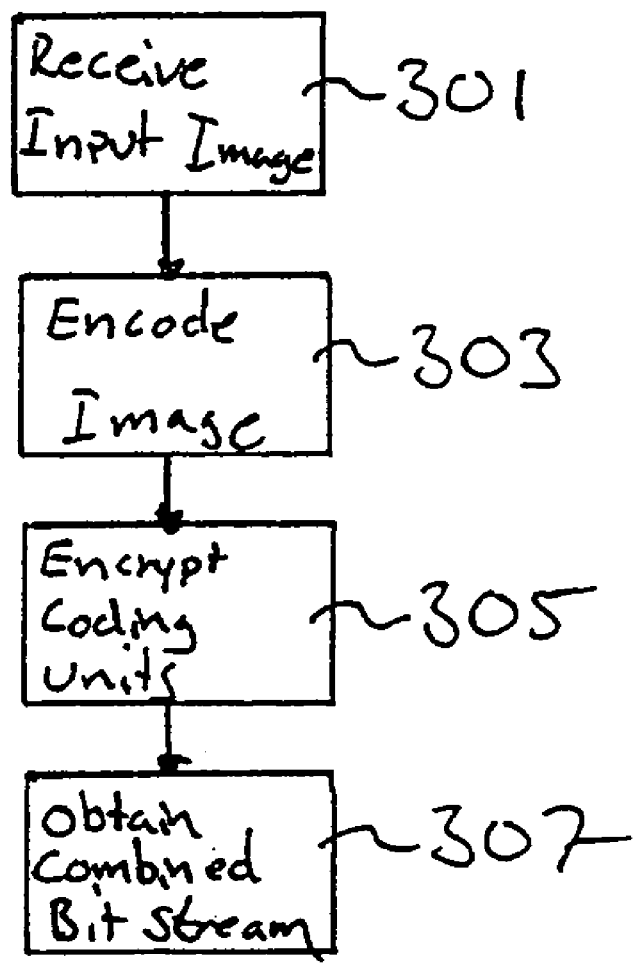
FIG. 3 is a flow chart illustrating some steps carried out when encrypting an image.

In FIG. 3, a flow chart illustrating different steps carried out when encrypting an image are shown. First, in a step 301, an image to be partially encrypted is received. The image received in step 301 is then coded using a coding algorithm generating independently decodable coding units, e.g. JPEG 2000, in a step 303.

Next, in a step 305, some of the coding units of the image coded in step 303 are encrypted using some suitable encryption method, such as DES. The coding units that are chosen to be encrypted can be set in accordance with user preferences. Thus, a user can chose to have coding units corresponding to ROIs, higher order bit-planes, etc, encrypted. Finally, the encrypted coding units and the coding units which are not encrypted are merged into a single bit stream.

Figure 4:
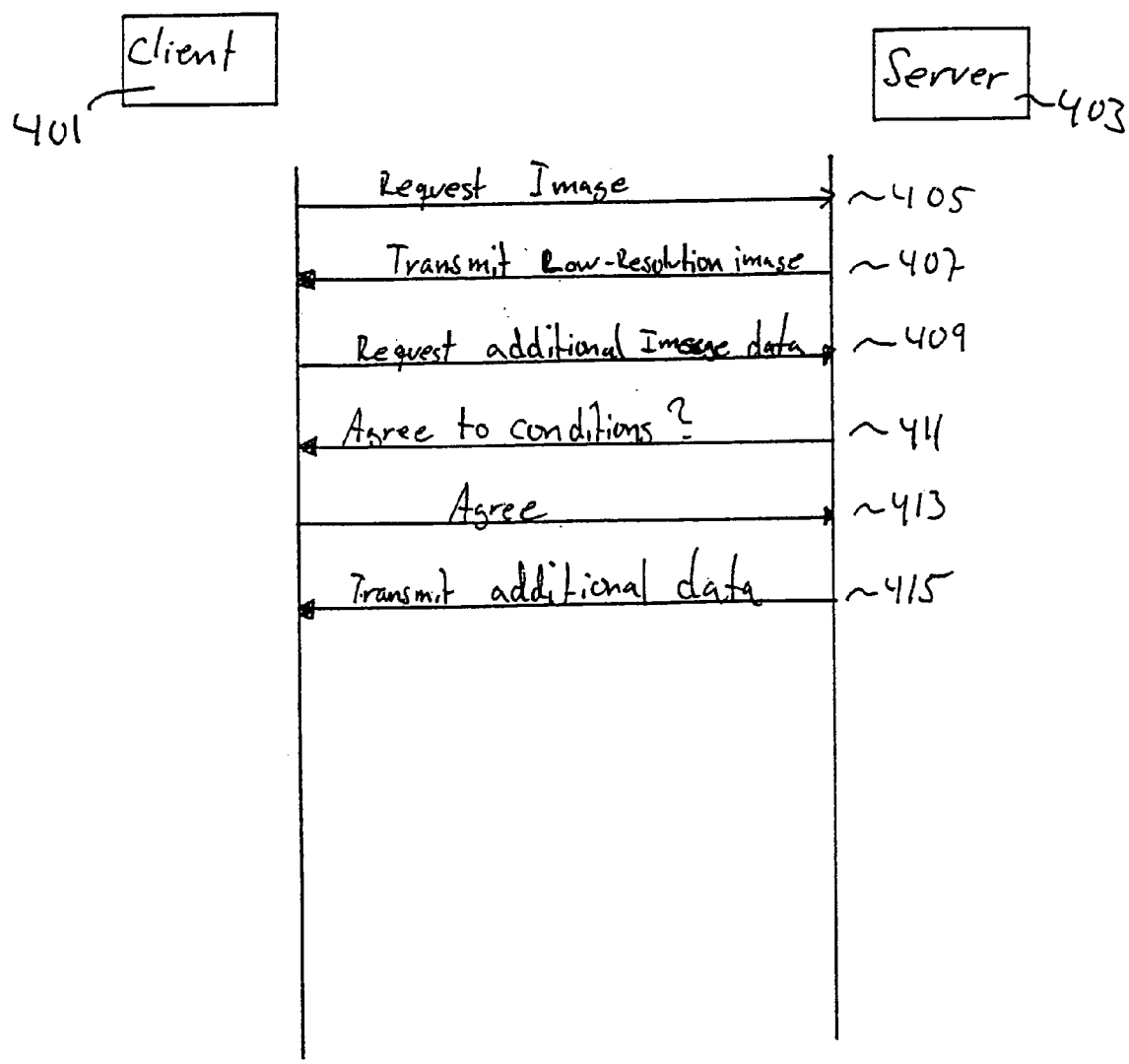
FIG. 4 is a diagram illustrating a client server process.

In FIG. 4, a flow chart illustrating a client-server process, when transmitting an image encoded according to the method as described in conjunction with FIG. 3 is shown. Thus, a client 401 is connected to a server 403. The client 401 can then issue a request towards the server 403 for a particular image, step 405.

The server 403 replies by transmitting the coding units of the image which are not encrypted, step 407. The not encrypted coding units can be decoded by the client who now will have access to a low resolution version or a part of the full image. Based on this information the client may wish to have access to the image in a higher resolution or the full image. If so the client transmits a request to the server requesting such information, step 409.

The server replies by sending a request to the client requesting the client to agree to the conditions for transmitting the higher resolution version of the image, step 411. If the client agrees via a message 413, e.g. comprising a card number or account number from which to bill the cost for the image, the server sends the encrypted coding units together with a key word by means of which the encrypted coding units can be decrypted, step 415. A secure method for key distribution should be used. Examples of such secure methods are described in W. Stallings "Data and computer Communications", p 635–637, Prentice-Hall 1997 fifth edition ISBN. 0-13-571274-2.

The client may already has access to the unencrypted and encrypted coding units, for example if he has purchased a CD-ROM with images coded as described herein. In such case, the scheme as described above can be modified so that no image data is transmitted. The client only agrees to conditions set by the server in order to have access to the key word(s) which are required to decrypt the encrypted coding units of the CD-ROM.

In the case when the method and device as described herein are used when encoding image according to the JPEG 2000 standard, it is advantageous if the JPEG 2000 standard does not standardize encryption methods. An Encryption Header that is included in the image header or optionally an Encryption Tag that is merged with the JPEG 2000 Tags can instead be used to specify how coding units are decrypted.

In such an embodiment the JPEG 2000 image header contains an Encryption Flag (EF). EF is then set if any coding unit is encrypted. An Encryption Header (EH) should then be appended to the JPEG 2000 image header and encryption information can optionally be merged into JPEG 2000 Tags.

Figure 5:
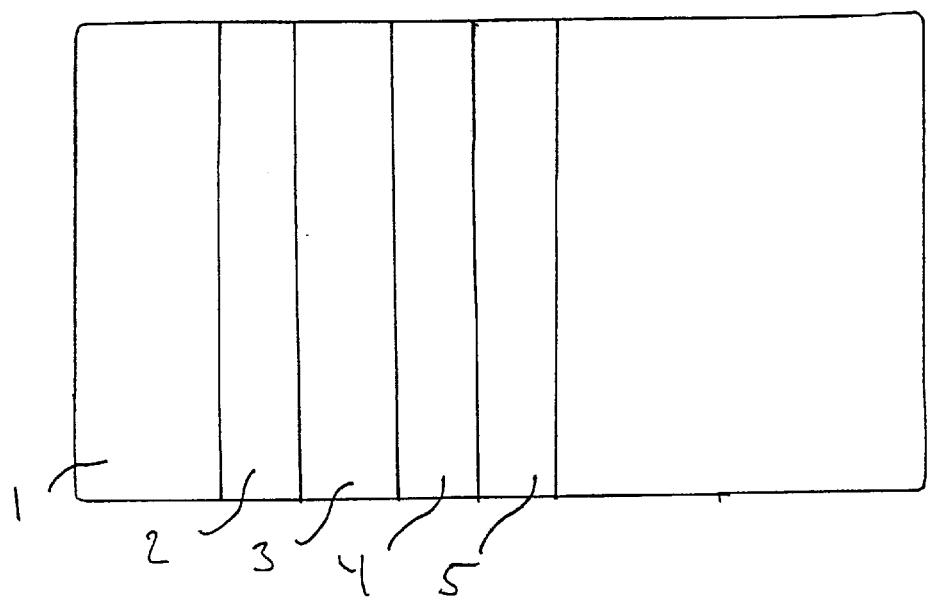
FIG. 5 is a view of an encryption header

In FIG. 5 an encryption header is shown. The Encryption Header can in such an embodiment contain the following symbols.

1) Encryption Mode (EM). A set of standard encryption modes are defined e.g.
a) One encryption method is used for all coding units
b) Bitplanes of less significance than bitplane X are encrypted
c) Subbands of higher resolution than Y are encrypted
d) ROIs specified in are encrypted, etc.
No encryption information needs to be included in the Tags if an EM is defined.
2) Encryption Mode Parameters (EMP). Parameters (X, Y, ... ) that are used to define the Encryption Mode are set here.
3) Number of encryption methods used. Several encryption methods can be used within the same image if e.g. different user groups should be allowed to see different image content.
4) One Encryption Method Descriptor (EMD) for each encryption method. The EMD defines any data that is needed by the encryption/decryption module. The type of encryption algorithm is defined. A typical use of EMD will be to include a keyword that is encrypted by a public key algorithm. The user supplies a private key for decrypting the enclosed encrypted key. The decrypted key is used by a fast decryption algorithm to decrypt image coding units. The order of the EMDs allocates an number to each encryption method. This number is used in UES symbols.
5) The bitstream must for each coding unit specify if it is encrypted and if so by what method. This is done by setting one Unit Encryption State (UES) symbol per coding unit. These symbols could either be collected in the encryption header or alternatively be distributed in the bitstream as encryption tags. If the UES information is kept in the encryption header we define a header element—Encryption State (ES). ES consists of a series of UES symbols that are listed in the same order as the coding units appear in the bit stream.

IF EF is set and the Encryption State is not given in the header, JPEG 2000 Tags can be expanded to contain Unit Encryption State (UES) symbols. UES defines which encryption method, if any, that is used for encrypting the next coding unit.

The transform coefficients belonging to a ROI can be handled as described above. They can be completely or partially encrypted by selecting appropriate coding units belonging to the ROI for encryption.

The main problem is that the shape of the ROI might reveal the content. If the shapes are encrypted it is, however, difficult to show a reduced quality image since it is difficult to interpret the coded transform coefficients.

This problem can be solved by defining a so called cloaking shape (c-shape). Thus, the real shape of one or several ROIs are completely enclosed in the c-shape. The c-shape is designed to not reveal sensitive image content. A simple example of a c-shape is a bounding box.

A c-shape is treated as one single ROI in the JPEG 2000 bit stream. The c-shape is coded without encryption as described in Charilaos Christopoulos (ed.), JPEG 2000 Verification Model Version 2.0. According to the technique as described therein this would result in that the shape is defined in the JPEG 2000 header.

A mask is created using the c-shape and the transform coefficients belonging to the c-shape is coded and encrypted using the method as described herein. This will result in that all coefficients belonging to any of the ROIs that are shielded by the c-shape are encrypted. The texture of the ROIs is thus protected by encryption.

The shape of the ROIs are encrypted and stored e.g. in the encryption header. The encryption header contains pointers that link encrypted ROI shapes with the corresponding c-shape. The decoder can now decode the unencrypted background. The c-shape can be displayed as a blank region. The original ROIs can be decoded if the keyword is known. This is done by decrypting the coefficients belonging to the c-shape. The shape of each ROI belonging to the c-shape is also decrypted. The bitstream can now be rearranged so that the c-shape is dropped and the original ROI data structures are restored. Note that this is done in the compressed domain.

The mask that is used for encoding a ROI is not uniquely defined in JPEG 2000. A mask that is sufficiently large so that the ROI is encoded lossless will often cover the whole lower subbands. A mask that is not allowed to expand will lead to a lossy encoding of the ROI. The masks belonging to different ROIs or to a ROI and the background can be designed to overlap. This means that some coefficients are encoded in more than one ROI. Such overlap will lead to a reduced overall compression but the ROIs are more independent so that any ROI can be accessed and decoded with a good visual result.

The partial encryption method for ROIs described herein is not dependent of the choice of mask as long as the mask is selected so that the content of a ROI cannot be reconstructed from the content of any other ROI or background. A method for building a mask that hides the content of the ROI is described in Charilaos Christopoulos (ed.), JPEG 2000 Verification Model Version 2.0.

By using the method and device as described herein storage and bandwidth requirements for partially encrypted images is reduced. Furthermore, object based composition and processing of encrypted objects are facilitated, and ROIs can be encrypted. Also, the shape of a ROI can be encrypted and the original object can be decrypted and restored in the compressed domain.

Another advantage is that encryption does not need to be performed at the same time as encoding the image. Thus, since the process takes place in the compressed domain (at the bitstream syntax) it is possible to encode all images without encryption. The encryption can be performed just before transmitting the image by a parser (transcoder). In this case, if the encryption increases the bitrate, which will be the case if the encryption is placed in the TAGS, the increase in bitrate is avoided and the encryption information is only added before transmitting it.

What is claimed is:

1. A method of decoding image data of an image comprising the steps of:
   receiving an image bit stream comprising header information and independently decodable coding units of said image, said header information identifying first image data of said image as not encrypted and second image data of said image as encrypted;
   decoding all of at least one independently decodable coding unit of said first image data identified by said header information as not encrypted;
   sending a request for a decryption key for decrypting at least one independently decodable coding unit of said second image data identified by said header information as encrypted;
   receiving a decryption key upon said request;
      decrypting the at least one independently decodable coding unit of said second image data with said received decryption key.

2. A method of decoding image data of an image comprising the steps of:
   receiving an image bit stream comprising header information and independently decodable coding units of said image, said header information identifying first image data of said image as not encrypted and second image data of said image as encrypted;
   decoding all of at least one independently decodable coding unit of said first image data identified by said header information as not encrypted;
   sending a request for a decryption key for decrypting at least one independently decodable coding unit of said second image data identified by said header information as encrypted;
   receiving a decryption key upon said request;
   receiving upon said request at least one independently decodable coding unit of said second image data;
   decrypting said at least one upon said request received independently decodable coding unit of said second image data with said received decryption key.

3. A method according to claim 1 comprising the further step of:
   receiving condition information that includes a cost for decrypting at least one independently decodable coding unit of said second image data identified by said header information in said image bit stream as encrypted.

4. A method according to claim 1, wherein the first image data identified by said header information in said image bit stream as not encrypted corresponds to a low resolution version of said image.

5. A method according to claim 1, wherein different independently decodable coding units are decoded using different decoding methods.

6. A method according to claim 1, wherein said header information in said image bit stream comprises an encryption flag identifying image data as encrypted first image data or as not encrypted second image data.

7. A method according to claim 6, wherein said encryption flag identifies an individual independently decodable coding unit of said image as encrypted first image data or as not encrypted second image data.

8. A method according to claim 1, wherein said second image data identified in said image bit stream as encrypted constitutes a region of interest in a cloaking shape.

9. A method according to claim 8, wherein said cloaking shape is a bounding box.

10. A method according to claim 1, further comprising:
    using the at least one independently decodable coding unit of said first image data to obtain a partial resolution version of the image; then
    obtaining a decryption key for decrypting at least one independently decodable coding unit of said second image data; and
    using the at least one independently decodable coding unit of said second image data to obtain a higher resolution version of the image than the partial resolution version.

11. A device for decoding image data of an image comprising:
    means for receiving an image bit stream of header information and independently decodable coding units of said image, said header information identifying first image data of said image as not encrypted and second image data of said image as encrypted;
    means for decoding all of at least one independently decodable coding unit of said first image data identified by said header information as not encrypted;
    means for sending a request for a decryption key for decrypting at least one independently decodable coding unit of said second image data identified by said header information as encrypted;
    means for receiving a decryption key upon said request; and
    means for decrypting at least one independently decodable coding unit of said second image data with said received decryption key.

12. A device for decoding image data of an image comprising:
    means for receiving an image bit stream of header information and independently decodable coding units of said image, said header information identifying first image data of said image as not encrypted and second image data of said image as encrypted;
    means for decoding all of at least one independently decodable coding unit of said first image data identified by said header information as not encrypted;
    means for sending a request for a decryption key for decrypting at least one independently decodable coding unit of said second image data identified by said header information as encrypted;
    means for receiving a decryption key upon said request; and
    means for receiving upon said request at least one independently decodable coding unit of said second image data;
    means for decrypting said at least one received independently decodable coding unit of said second image data with said received decryption key.

13. A device according to claim 11, further comprising:
    means for receiving condition information that includes a cost for decrypting at least one independently decodable coding unit of said second image data identified by said header information in said image bit stream as encrypted.

14. A device according to claim 11, further comprising means for decoding different independently decodable coding units using different decoding methods.

15. A device for encoding image data of an image comprising:
   means for sending encoded image data of said image in a bit stream;
   means for inserting header information in said image data bit stream, said header information identifying first image data as not encrypted, said header information identifying second image data as encrypted;
   means for sending condition information that includes a cost for decrypting second image data of said image;
   means for receiving a request for a decryption key for decrypting second image data of said image;
   means for sending a decryption key for decrypting the second image data of said image.

16. A device according to claim 15, further comprising:
   means for sending encrypted second image data of said image upon said request.

17. A device according to claim 15, further comprising:
   means for inserting an encryption flag as header information for identifying image data of said image as not encrypted first image data or as encrypted second image data.

18. A device according to claim 15, further comprising:
   means for inserting an encryption flag as header information for identifying an individual independently decodable coding unit of said image as not encrypted first image data or as encrypted second image data.

19. A device according to claim 11, further comprising:
   means for using the at least one independently decodable coding unit of said first image data to obtain a partial resolution version of the image; then
   means for obtaining a decryption key for decrypting at least one independently decodable coding unit of said second image data; and
   means for using the at least one independently decodable coding unit of said second image data to obtain a higher resolution version of the image than the partial resolution version.

* * * * *